Oct. 27, 1959 A. H. FAULKNER 2,910,543

PAYSTATION PARTY LINE LOCKOUT SYSTEMS

Filed June 15, 1955 7 Sheets-Sheet 1

INVENTOR.
ALFRED H. FAULKNER
BY Wm Walter Owen.
ATTY.

Oct. 27, 1959 A. H. FAULKNER 2,910,543

PAYSTATION PARTY LINE LOCKOUT SYSTEMS

Filed June 15, 1955 7 Sheets-Sheet 2

REPEATER

INVENTOR.
ALFRED H. FAULKNER
BY Wm. Walter Owen
ATTY.

Oct. 27, 1959 A. H. FAULKNER 2,910,543

PAYSTATION PARTY LINE LOCKOUT SYSTEMS

Filed June 15, 1955 7 Sheets-Sheet 3

INVENTOR.
ALFRED H. FAULKNER
BY Wm. Walter Owen.
ATTY.

INVENTOR.
ALFRED H. FAULKNER
BY Mc Watters Owen.
ATTY.

PAYSTATION PARTY LINE LOCKOUT SYSTEMS

Filed June 15, 1955 7 Sheets-Sheet 5

INVENTOR.
ALFRED H. FAULKNER
BY Wm. Walter Owen.
ATTY.

INVENTOR.
ALFRED H. FAULKNER
BY [signature]
ATTY.

INVENTOR.
ALFRED H. FAULKNER
BY [signature]
ATTY.

2,910,543

PAYSTATION PARTY LINE LOCKOUT SYSTEMS

Alfred H. Faulkner, Chicago, Ill., assignor to General Telephone Laboratories, Incorporated, a corporation of Delaware Application June 15, 1955, Serial No. 515,683

11 Claims. (Cl. 179—17)

Figure 1:
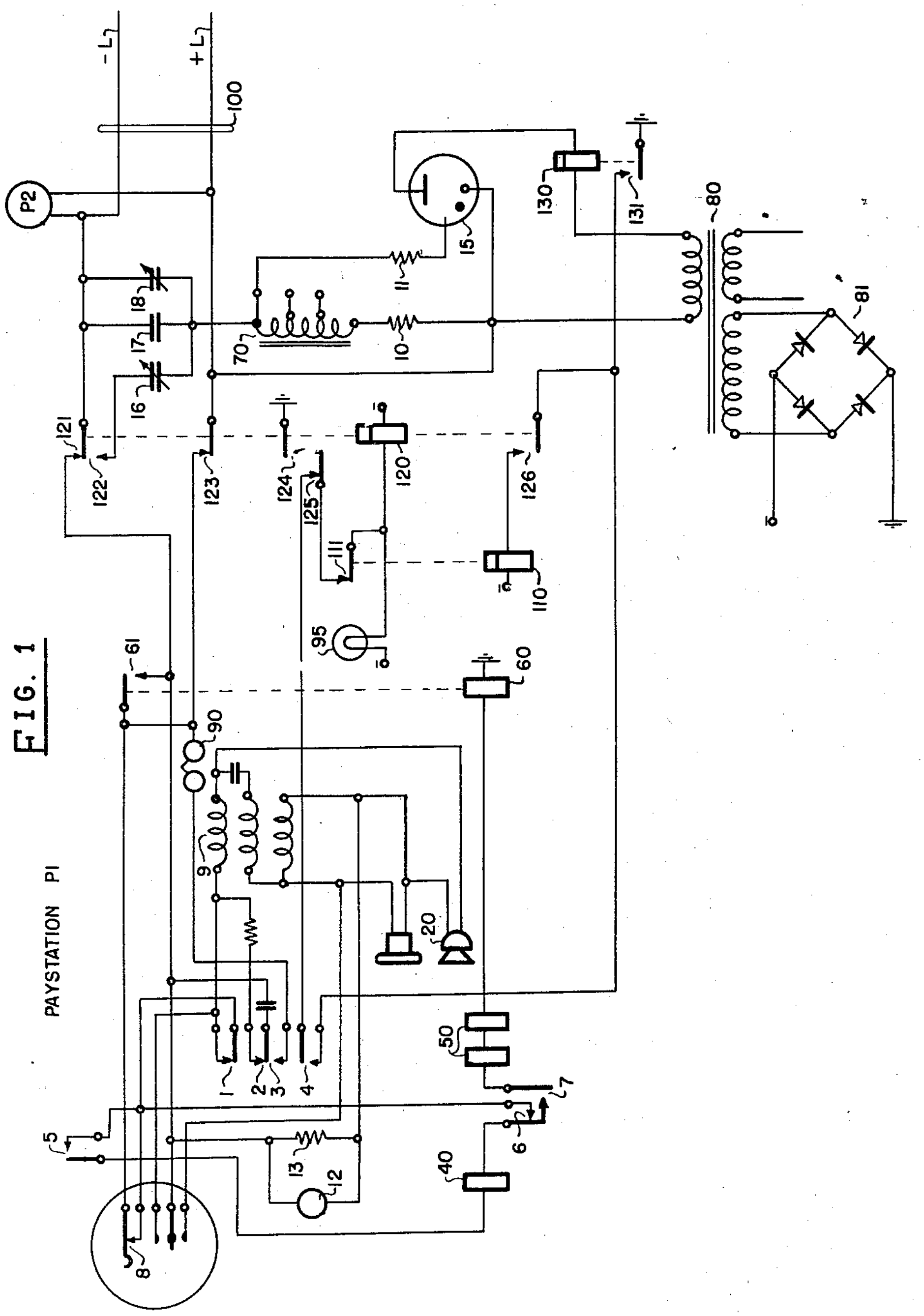

This invention relates to telephone systems in general and in particular to improvements in a party line arrangement for a telephone system in which substations on the party or common line have paystation equipment and are provided secret service.

The invention disclosed herein is a direct improvement on the invention disclosed in the application of Clarence E. Lomax filed May 6, 1955, Serial No. 506,453.

The general object of this invention is to provide secret service to the paystation users when a plurality of paystations are connected to a common two conductor line as in the preceding application, however specifically the object is to have the lock-out facilities controlled independently of other required signals.

A feature of this invention is that the lock-out facilities at the paystation are controlled by a pulse of predetermined frequency.

Another feature of this invention is the dual use of the tone detection circuit at different frequencies to effect lock-out and release functions. These and other features of this invention will become apparent as the description progresses.

The present system is arranged to provide completely automatic service to a party initiating a call from one of said party line paystations to any local subscriber, and to provide both toll and reverting call service with the aid of an operator. The coin magnet at each paystation is controlled automatically from the central office equipment for either a collect or refund operation on a local call and a collect operation on a completed toll call, but is manually controlled from an operator's position for a reverting call and on an uncompleted toll call. It is intended that the circuits illustrated herein will function with the well known Strowger step-by-step switching equipment indicated in the drawings in block form, although the invention is by no means limited to the use of such switches.

The present invention is therefore arranged to provide a prepay party line paystation telephone system utilizing a lock-out relay at each station for locking out non-calling or non-called stations and controlled by equipment at both the central office and at each paystation, and equipment operative for the purpose of providing the above services economically and in an improved manner.

Figure 6:
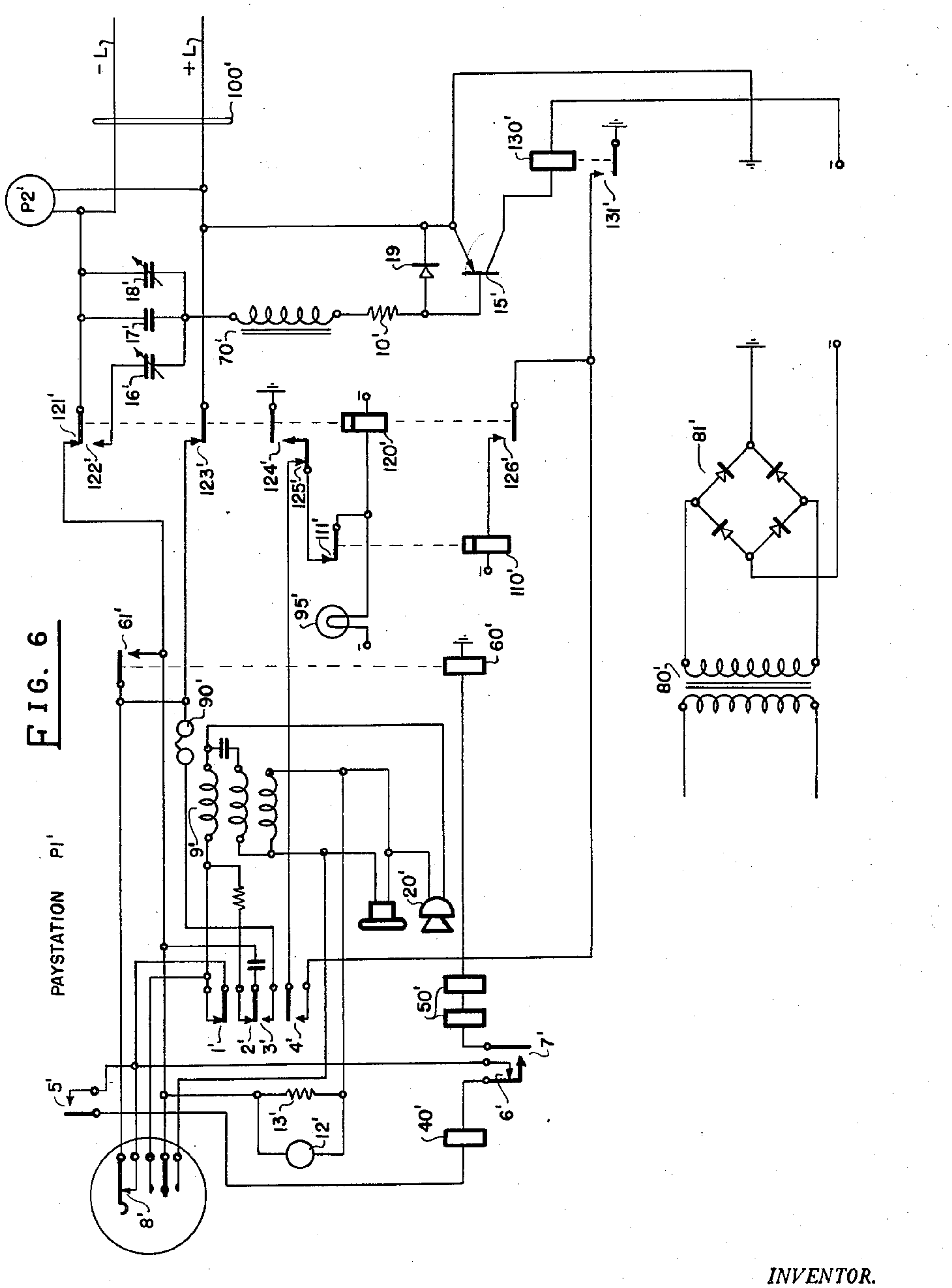

Fig. 1 discloses the details of one party line paystation circuit and shows another paystation indicated by the reference character P2 connected to the same line. Fig. 6 discloses the details of another optional party line paystation circuit utilizing a transistor instead of a gas discharge tube such as used in Fig. 1, and may be used interchangeably with the paystation circuit of Fig. 1. A total of four stations are to be considered as being connected to the line 100, although all are not shown, nor is the grouping necessarily limited to four.

Figure 2:
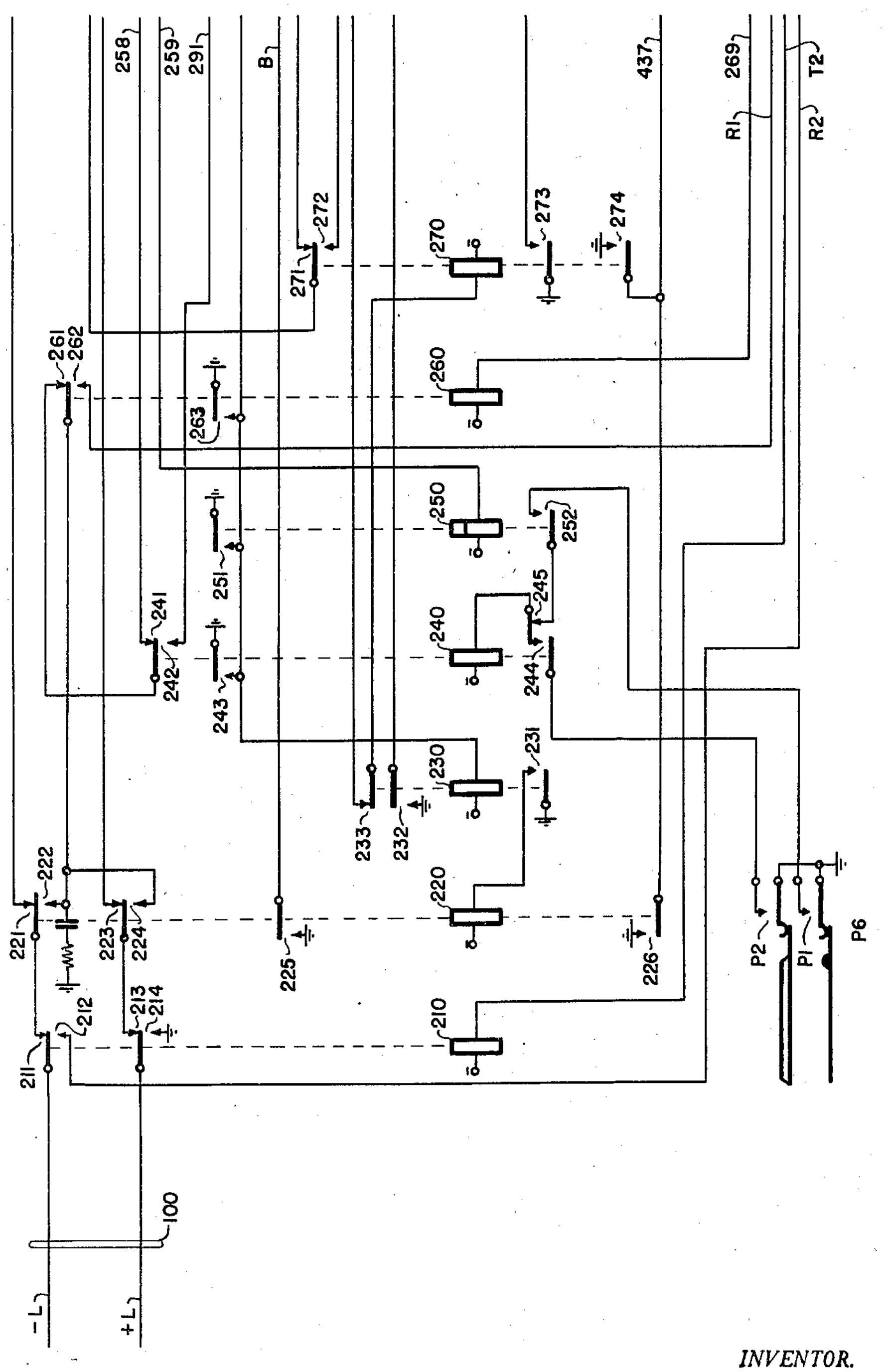
Figure 3:
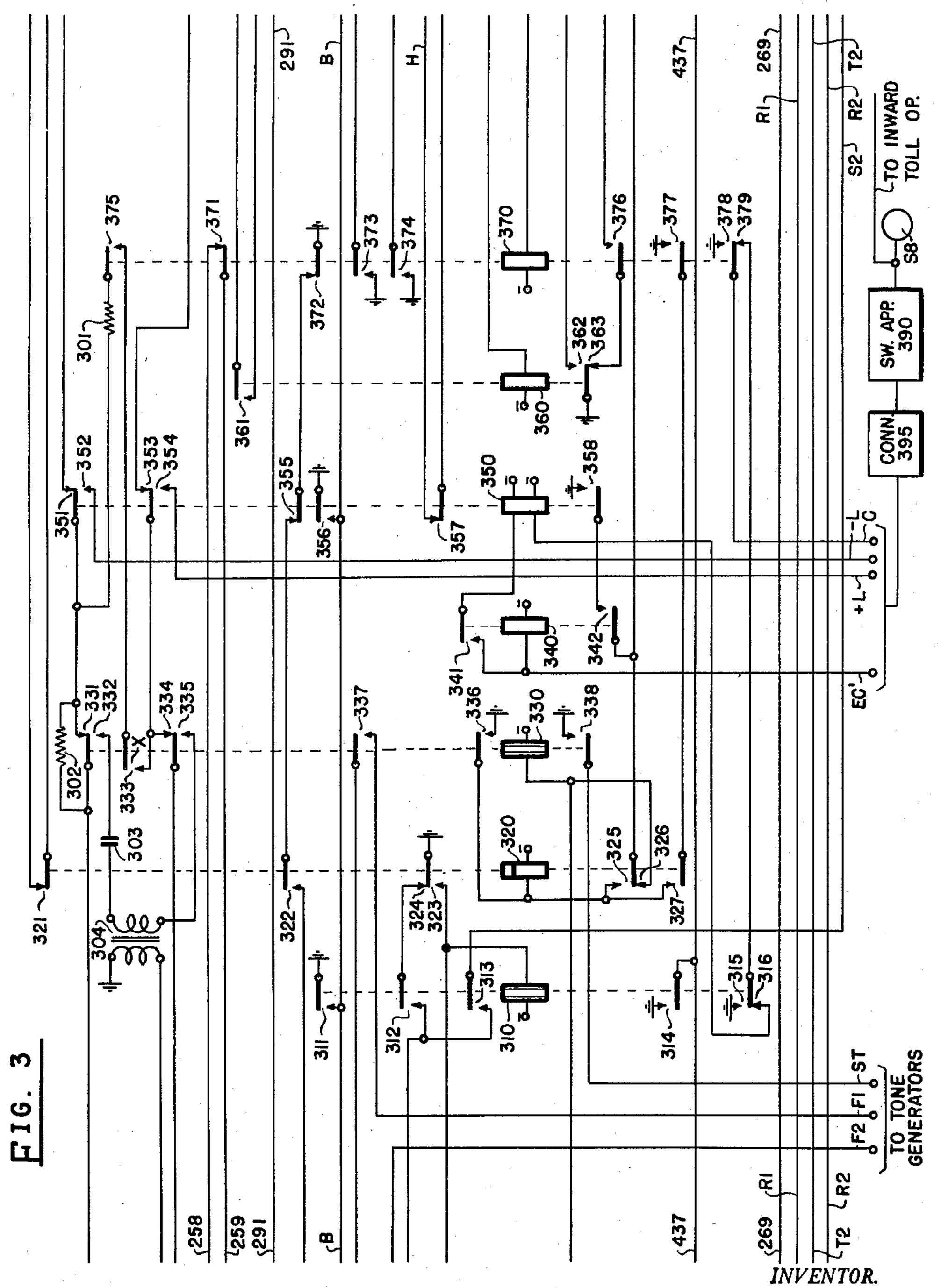
Figure 4:
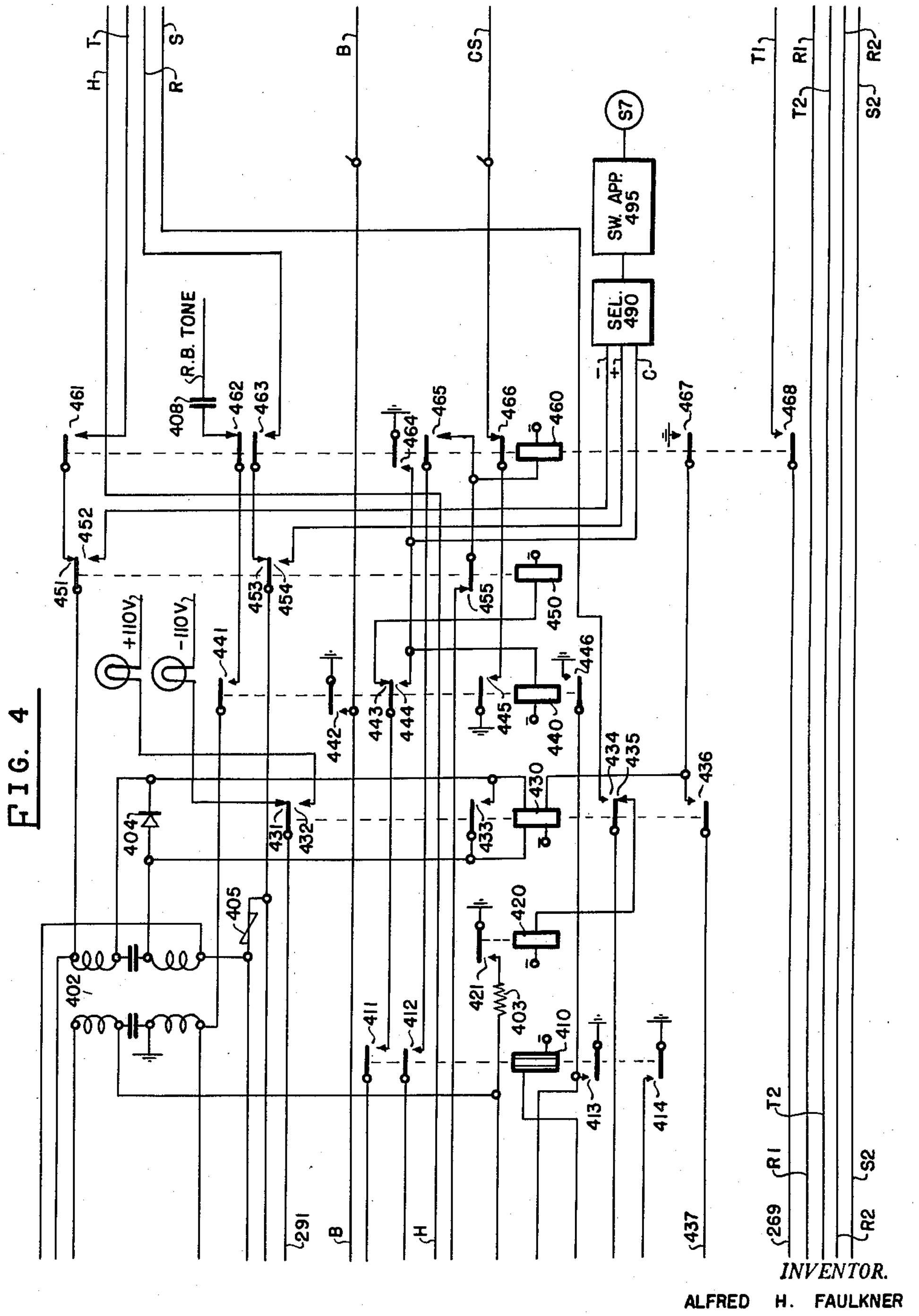
Figure 5:
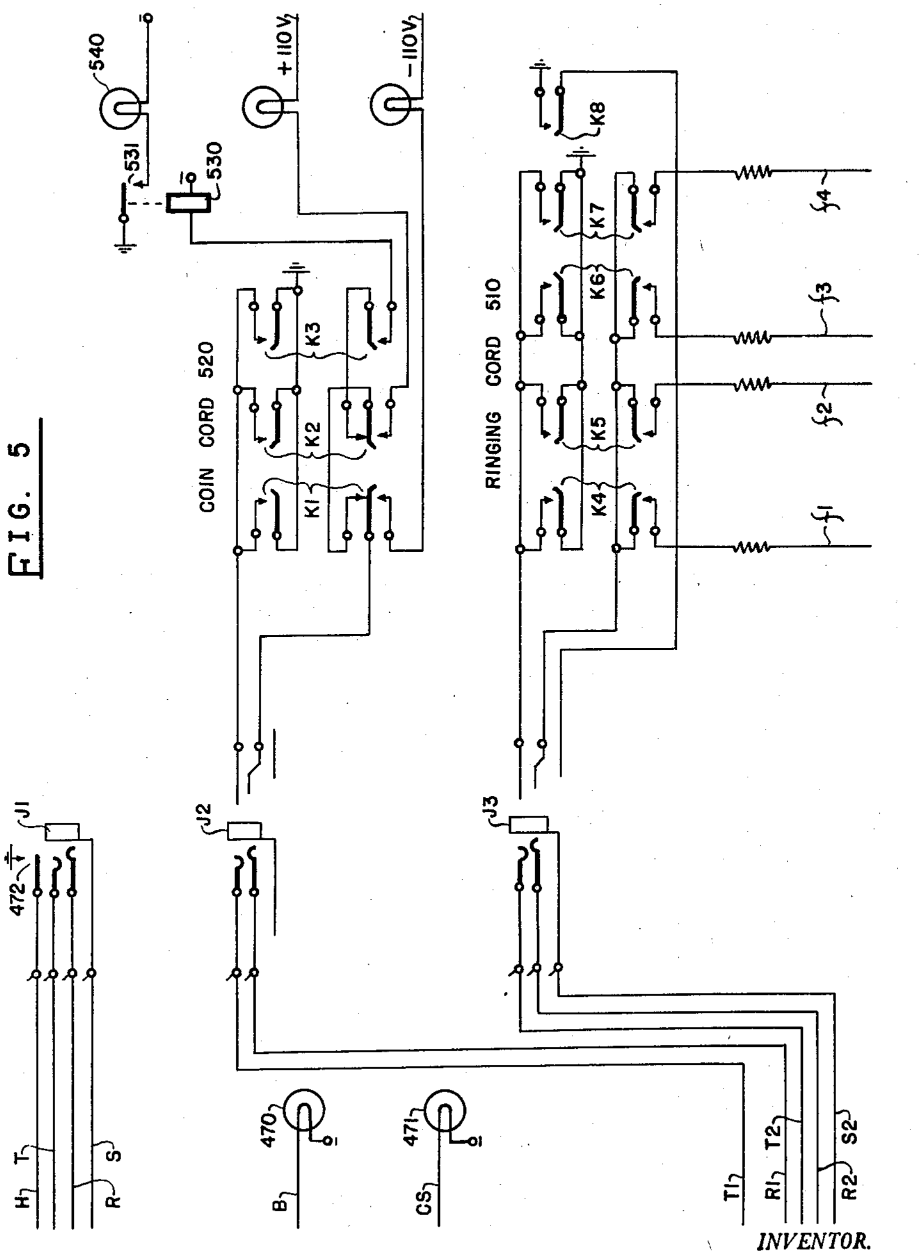

Figs. 2, 3 and 4 together disclose the repeater circuit 200, individual to line 100 and therefore common only to the four stations on line 100. Fig. 5 shows part of the operator's equipment for connecting with the repeater and controlling coin and ringing operations. A number of such repeaters may be provided in the exchange, one for each group of party line paystations connected to a single line, however for our purposes the description will generally proceed as though only repeater 200 is in use. The repeater circuit terminates at a number of operator positions, only one of which is indicated here by jacks J1, J2 and J3 in Fig. 5. The operator has access to jack J1 through any well-known type of cord circuit for the purpose of talking to a calling party line subscriber or extending and controlling a talking connection to another party from or to a party line subscriber; to jack J2 through coin cord 520 and to jack J3 through ringing cord 510. The use of an individual repeater circuit for each party line is dictated only by economic reasons as a great number of party line paystations are not necessary in any one exchange. The control equipment included in the repeater circuit can easily be included in finder-selector links if there are a larger number of party lines, but this would necessitate the installation of such equipment in all links having access to the party lines.

Figure 7:
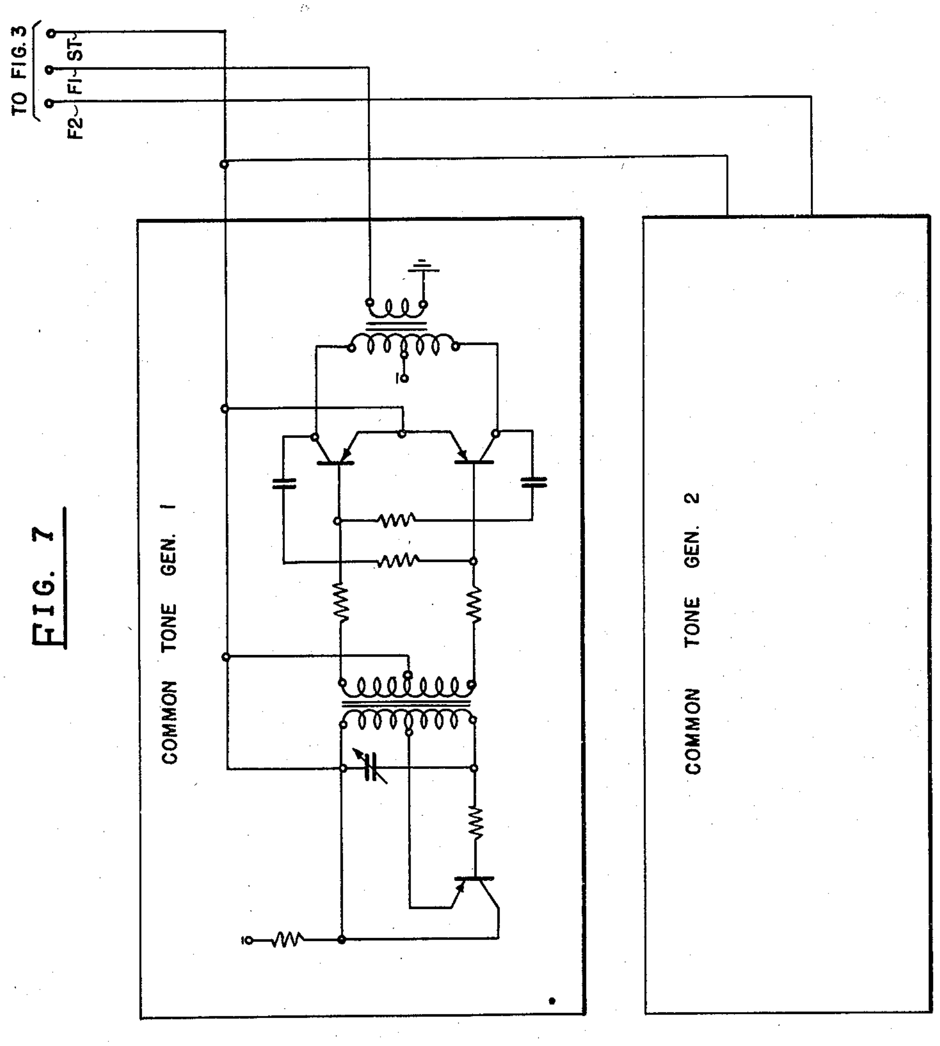

In Fig. 7 are shown the circuits of the tone generators for supplying locking and unlocking tones to the repeaters. Common tone generators capable of supplying a number of repeaters are shown, however tone generators individual to each repeater may be used.

A calling party initiates a call from one of the paystations P1 in the usual manner by lifting his handset and depositing coins of the proper value. The present invention is intended for use with a two nickel or one dime paystation mechanism such as disclosed in Patent No. 2,674,655 issued to Gallagher on April 6, 1954, wherein a calling party must deposit either one dime or two nickels before the dial springs 8 can be operated effectively. A restoring magnet 40 operated in conjunction with the coin magnet 50 opens the nickel springs 5 if they are not previously restored to normal while 50 resets the other equipment to its original position on termination of a call. The repeater circuit 200, common to the four parties, is seized upon the removal of the handset. On seizure the repeater sends a momentary lock-out pulse of 7000 cycles alternating current over both line leads to each paystation on the line. At the paystations this current passing through the series resonant circuit composed of capacitors 17, and 18, coil 70 and resistance 10 causes a voltage of the order of 100 volts to appear between the cathode and starting electrode of tube 15. Cold cathode tube 15 fires and causes relay 130 to operate at all of the stations. Relay 130 has an armature end slug when used in conjunction with the alternating current supply for tube 15 to prevent its chattering. This will cause the relays 120 to operate at all of the stations except the calling station where the operating circuit is opened at the hookswitch springs 4. Each relay 120 operating at the non-calling stations, locks itself at contacts 124, disconnects the associated station from the line, and at contacts 122 changes the resonant frequency of the tuned circuit. Tube 15 de-energizes at the end of the lock-out pulse permitting relay 130 to fall back before relay 110 has had time to operate. Lamp 95 lights in parallel with lock-out relay 120 to indicate to prospective users that the station is temporarily locked out. After the lock-out pulse has been sent, dial tone is sent out over the line to indicate that a suitable deposit should be made before any dialling can commence.

The paystation of Fig. 6 performs in a manner similar to the paystation of Fig. 1 and may be used interchangeably with it, in conjunction with the repeater circuit of Figs. 2, 3, 4, 5 and 7.

A party initiates a call by lifting his handset and depositing the proper coin value. On seizure the repeater sends a momentary lock-out pulse of 7000 cycles alternating current over both line leads to each paystation on the line. At the paystation of Fig. 6 this alternating current passes through the series resonant circuit composed of capacitors 17' and 18', coil 70, resistor 10' and the rectifier 19 during one half cycle, and through the transistor 15' during the other half cycle. The current through the transistor passes from the emitter to the base causing a power amplification of current through the local circuit of the collector electrode. This consists of a positive potential to the emitter of the transistor 15' through it to the collector and then through relay 130' to a negative potential. The potentials for the operation of this local circuit are supplied from the local rectifier consisting of dry disc rectifier bridge 81' and transformer 80' whose operation is obvious. The operation of the components of this circuit after relay 130' operates is identical to the corresponding components of Fig. 1.

In keeping with the general practice, +110 volt battery is used to operate the coin magnet 50 to collect a deposit and —110 volt battery is used to refund a deposit. In the folowing explanation it will be assumed that paystation P1 is connected to the line though the operation would remain the same were the paystation of Fig. 6 used.

The repeater circuit 200 in this instance has the Strowger selector switch 490 individual to it. The first digit dialled by a party at a party line station desiring to call another party on the same line (reverting call) or toll is zero. The selector switch is thereby operated to the tenth level where its normal post springs (not shown) close contacts to return ground back to the repeater to cause the repeater to release the selector 490 and signal the operator by lighting a lamp such as 471. Any other well-known type of means may be provided at the selector for returning ground in the event a reverting call is begun by dialling a predetermined digit other than zero. If the call is a local one, selector 490 is operated to some level besides the tenth, where it hunts for and seizes idle switching apparatus 495 (including a connector switch seized either after a second digit is dialled or after the first digit is dialled) in the well-known manner. The number of digits dialled is of course dependent on the size and arrangement of the system in which the present invention is utilized. The repeater is arranged to prevent interference by an operator on any call not routed to the operator. The switching apparatus is then operated by the other digits to connect to a desired call subscriber such as S7. Battery on the leads + and — Fig. 4 is reversed by the connector on answer by the called party to operate relay 430, and at the end of the call the repeater automatically collects the deposit and applies unlocking potential of 6000 cycles to the locked out stations. If any call is terminated by the calling party before answer by either the operator or a called party the repeater automatically causes the coin magnet at the calling station to refund the deposit and applies unlocking current to release the lock-out relays at all stations to connect the trunk conductors +L and —L of line 100 to all stations.

A busy lamp such as 470 at each operator's position is lighted, whenever the repeater is seized. If signalled by a lamp such as 471, as on a toll or reverting call, one of the operators inserts her plug in a jack such as J1 and completes a talking connection to the calling party. On securing the desired information, she completes the call, if it is a toll call, through her cord circuit (not shown). She may, before extending the connection or at any time she has access to repeater 200, manually collect or refund coins. On completion of the toll call, the repeater which was thrown into the collect position by operation of relay 430 on answer by the operator, collects the coins that are on deposit. If it is a reverting call, she instructs the calling party to hang up while she rings the called party. Reverting calls although probably not important to transients must be provided for those parties inhabiting or working in the area who must have service to others on the line. Both calling and called parties are rung periodically. A harmonic ringing frequency individual to the called station is applied from a key such as K4, K5, K6 or K7 for operating the desired ringer such as 90 to signal the called station. The operator cannot ring the called station until she has reconnected it to the line, which she can do by inserting ringing cord 510 into jack J3 and operating key K8 associated with the ringing cord. After she has reconnected the called party to the line, she periodically operates one of the aforementioned keys individual to the called party's frequency as indicated by the last digit of the called party's number to signal the called party. The calling party's ringer is operated by alternately operating a key associated with cord 510 individual to his frequency. He is instructed that if his ringer is not operated periodically to come back on the line. When the call is answered, the operator is signalled. She stops ringing and the calling party then comes on the line. The repeater 200 automatically tests for a deposit upon termination of the call, and if there is a coin on deposit, coin collect battery is connected to the line. The operator is signalled when either the calling or called party comes on the line, by a cord circuit lamp (not shown), which is operated from the repeater. Only the first party to come on signals the operator through her cord lamp. The operator performs all functions through the repeater common to the party lines.

It will be noticed that the calling party on a toll call or either party on a reverting call (if the other has hung up) may flash the operator's cord lamps by jiggling his hookswitch several times to quickly open and close the loop to the repeater without running the risk of being locked out when springs such as 4 close, as the lock-out pulse to the various lock-out relays was on only momentarily when the repeater was initially seized. The operator at this time may desire to test to see if a coin is on deposit before performing any services for the party. This she does by inserting coin cord 520 in jack J2 and operating key K3 to light lamp 540 if a coin is on deposit. She may then act accordingly, and if any doubt exists as to the amount, she may refund by operating key K1 to apply refund potential to the appropriate coin magnet. If she desires to collect a coin she operates key K2 to apply collect potential to the coin magnet.

If the call is a delayed toll call she may refund the deposit through cord circuit 520 after instructing the calling party to hang up. She then unlocks all the stations by operating key K8 with cord 510 inserted in jack J3 to permit calls to be established, while she secures the called party. She waits until repeater 200 is idle and rings back the calling party while holding the called party. Before completing the talking connection through her cord circuit in any well-known manner, she requests the deposit of the proper coin value from the calling party. The repeater automatically collects the deposit on termination of the call. The operator has access, at any time the repeater 200 is idle, to any of the parties on the line by merely inserting her ringing cord 510 in jack J3, operating the appropriate ringing key and inserting the plug of her cord circuit in jack J1 to complete a talking circuit to the called party when he comes on the line.

Reverse charge calls must be completed from an operator having direct access to repeater 200. She completes the connection through her cord circuit from the incoming toll operator by first signalling the desired station as described and requesting the proper coin deposit which the repeater automatically collects on release of the connection.

Incoming calls from a local subscriber such as S8 or a toll operator, who need not secure a coin deposit from the called party, are completed over switching apparatus such as 390 and a connector such as 395. Connectors such as 395 having access to the paystation repeaters are arranged to provide harmonic ringing individual to the called station, through the repeater, on the dialling of a last digit on the connector. This arrangement is very generally used for connectors having access to party lines. For the purpose of illustrating the manner of operation of the invention, connector 395 is described as a three digit connector, although many other arrangements may be provided such as one wherein each connector having access to the party lines is arranged to provide a frequency individual thereto and individual to one station on the party line. The connector is of course seized after an appropriate number of digits are dialled over the selector switches included in switching apparatus 390. On a call directed to a party line, assuming a three digit connector is used, the first two digits control the connector to connect to the desired party line while the third digit controls the connector to select a frequency individual to the called station on the party line and apply the selected frequency to the line for signalling the called party. The repeater is busied to other incoming calls and to the operator at the connector banks and on answer by the called party automatically locks out the non-called stations.

*Outgoing local call*

Removal of the handset at station P1 (assumed to be the calling party line station) from its hookswitch, closes springs 1 and 2 and opens springs 3 and 4 as shown. Opening of springs 3 removes the ringer 90 from across the line, while opening of springs 4 ensures that relay 120 remains in its off position when a lock-out pulse is sent to the remaining stations on the line. A circuit is completed to the repeater 200 whereby it causes the operation of the lock-out relay at each other party line station to its locked position, but completion of the call is not possible until a proper coin deposit is made.

The closing of contact springs 1 at station P1 completes a circuit from negative battery through the coil of relay 360 of Fig. 3, upper primary winding of repeating coil 402, contacts 351, 331, 221 and 211 through line lead —L, contacts 121, coin transmitter 12 and resistor 13 in shunt therewith, transmitter 20, induction coil 9, hookswitch springs 1, dial pulsing springs 8 shunted by springs 6 and coil 40, then to springs 123 and line lead +L, through the +L line back to contacts 213 and 223, contacts 334 and 353 to the lower primary winding of repeating coil 402 to ground.

Relay 360 operates in this circuit to close contacts 362 and complete an obvious circuit to slow-to-release relay 410 in Fig. 4. Relay 410 closes contacts 411, 412, 413 and 414. At contacts 413 an obvious circuit is completed to relay 370 which operates to ground lead C′ at contacts 378 and busy the repeater 200 to incoming calls from a connector switch such as 395. At contacts 414 relay 410 completed a circuit, 414 to 326, to relay 330. Relay 330 connects a 7000 cycle A.C. from terminal F1 contacts 337 and 271 to the primary of transformer 304, after grounding oscillator start lead ST, then at contacts 332 and 335 the 7000 cycle tone is connected to both line wires. Relay 360 will not fall back during the transmission of this pulse because of a shunt path created by resistor 301 and contacts 375 which is completed by the preliminary make contacts 333 of relay 330. Relay 330 simultaneously completes an obvious circuit to relay 320 at contacts 336, but relay 320 is slow to operate and thus gives relay 330 time to become well saturated before its circuit is opened at contacts 326, and the lock-out frequency pulse removed from the line conductors. The lock-out frequency may be supplied from any type of alternating current generator, an electron coupled transistor oscillator is shown only by way of example.

All of the paystations associated with this line are connected to it and their relays corresponding to relay 120 are in a position such that contacts 121 and 123 are made, as are also the hookswitch contacts corresponding to 4 except at the calling station where contacts 4 are opened. When the 7000 cycle lock-out pulse is impressed on the line conductors the gas tubes corresponding to 15 will be fired due to the potential across impedance 70 and resistor 10 of the series resonant circuit which includes capacitors 17 and 18.

The signal level of the 7000 cycle lock-out tone may be in the order of five volts at the exchange, but due to losses in transmission this may be reduced to only a few volts at the paystation. By reason of the high Q of the tuned circuit a voltage of the order of 100 volts appears across the coil 70 and resistor 10. The sensitivity of the tone detection circuit is purposely made low enough, by adjustment of the taps on coil 70, so that the strongest speech signals are below the threshold value required to fire tube 15.

When tubes corresponding to 15 fire they complete a circuit for relays corresponding to 130 at each paystation. This completes at contacts corresponding to 131 a circuit, through contacts corresponding to hookswitch contacts 4, relay contacts 111 and 125 to a relay corresponding to 120 at all the stations except the calling station, where the circuit is open at hookswitch contacts 4. Each operated relay corresponding to 120 locks itself at contacts corresponding to 124, at contacts corresponding to 122 changes the resonant frequency of the tuned circuit and at contacts corresponding to 121 and 123 disconnects the associated stations from the line. When the resonant frequency of the tuned circuit is changed the cold cathode tubes are deenergized and the relays corresponding to 130 release. The operated lock-out relays remain in the lock-out position. At the locked out paystations a lamp corresponding to 95 remains lighted in parallel with the lock-out relay to indicate to potential users that the paystation is temporarily locked out.

The repeater, during the interval that it had the lock-out pulse on the line, has seized its associated selector. Relay 370 in operating, closed contacts 373 sending ground through previously made contacts 411, break contacts 443 to operate relay 450. Relay 450 completes a circuit from the negative lead of selector 490 through the make contacts 452, the upper secondary winding of repeating coil 402, a winding of polar relay 430, the lower secondary winding of the repeating coil 402, contacts 361, make contacts 454 to the positive selector lead. The selector 490 upon seizure returns dial tone to the repeater, but this is prevented from reaching the paystation during the period of the lock-out pulse, by the contacts 321 shunting the repeating coil 402.

Upon removal of the lock-out pulse from the line, relay 320 removes the shunt from the repeating coil 402 at contacts 321, and completes an obvious circuit to relay 310 at contacts 323, whereby relay 310 at contacts 311 marks this paystation line busy to the operator by lighting a busy lamp 470.

The party at the paystation receives dial tone which indicates to him that he must make a coin deposit and then commence to dial the desired number. In accordance with the currently standard practice shunt springs 5 are closed on the deposit of a nickel while coin springs 6 are opened and 7 closed. The deposit of a second nickel merely opens shunt springs 5. The deposit of a dime does not affect springs 5, however it does close springs 7 and open springs 6. The deposit of a first nickel completes a circuit from ground on the right of relay 60 through coin magnet 50, springs 7, restoring magnet 40, springs 5 and 8 in shunt, springs 1, coil 9, voice transmitter 20, coin transmitter 12 and resistor 13 in shunt, contacts 121 and the —L line to the repeater over the previously described path to relay 360 and negative battery. Deposit of a dime completes the same circuit with the exception that springs 5 remain open. It will be noticed that the ground on the +L line now shunts restoring magnet 40, coin magnet 50 and relay 60, Springs 5 are effective if only one nickel has been deposited to prevent the transmission of dial pulses to pulse the selector line relay (not shown) in a manner to be described. Deposit of a second nickel simply opens springs 5 to permit effective operation of the dial while deposit of a dime in place of the two nickels results in the completing of the circuit previously described with the exception that shunt springs 5 are not closed at any time.

The calling party (assuming that the proper coin value is deposited) operates his dial to open and close dial springs 8 a number of times corresponding to the digit dialled. This opens and closes the previously described loop to relay 360 a corresponding number of times and it energizes and releases a corresponding number of times. Relay 360 on releasing closes the circuit contacts 363, 376 and 435 to relay 420 which energizes to complete a circuit at contacts 421 for aiding the energization of relay 360 after each release so that relay 360 is fully energized quickly on each closing of the dial springs 8. This special energizing circuit is provided because relay 360 is in a high resistance line and therefore would tend to have an excessively fast release period. The selector line relay is pulsed at contacts 361 so that the selector is operated in the well-known manner to a position corresponding to the digit dialled. The silicon carbide resistor 405 bridged across the pulsing springs 361 slightly delays the release of the selector line relay when contacts 361 open as the selector line relay provides an inductive kick that lowers the resistance of the resistor momentarily. The resistor also serves to protect the pulsing springs 361. Its use is preferred to that of a condenser, which may discharge and quicken the release of the selector line relay. This can be a problem in the case of a slow dial, as relay 360 provides a long open pulse due to its being in a high resistance line.

Assuming that this is a local call, the selector 490 is operated to any level but the tenth on the first digit and then hunts for and finds in the well-known manner an idle selector or connector such as is indicated by the block marked switching apparatus 495 and extends an energizing loop including the secondary coil 402, contacts 361 and the + and — leads respectively to the line relay (not shown) of the next switch. A series of digits then dialled by the calling party operates relay 360 a corresponding number of times to in turn open and close contacts 361 correspondingly and operate the following switching equipment 495 including a connector to a position corresponding to the series of digits dialled. It then connects to a local subscriber such as S7, applies ringing current to the called line and returns ring back tone over the connector energizing loop, repeating coil 402 and the loop back to the calling party, if the line of subscriber S7 is idle. The calling party then knows the called party is being rung. Otherwise busy tone is returned over the described loop to indicate that the called subscriber's line is busy. The called party on answering causes the connector to reverse battery on the + and — leads in the well-known manner. When battery is reversed, rectifier 404 no longer shunts the upper winding of relay 430 and it operates in series with the energizing loop to the connector line relay to open contacts 431 and 435 and close contacts 432, 433, 434 and 436. Contacts 433 now shunt the upper winding of relay 430, however the lower winding of relay 430 is energized over contacts 436, conductor 437 and contacts 314 to maintain the contacts of relay 430 operated. Contacts 435 open a point in the circuit to relay 420 and at contacts 432 a point is prepared in a circuit to provide collect potential to the coin magnet 50 at the calling paystation.

If the called party does not answer for any reason, or if the calling party has not operated the selector or succeeding switches, battery is not reversed on the + and — leads, and relay 430 is not operated. The calling party on replacing his handset opens hookswitch springs 1 to open the loop to relay 360. Relay 360 releases to release the selector switch line relay at contacts 361 and the selector releases. At contacts 362 the circuit to relay 410 is opened, and it releases after a period of time to in turn release relay 370 at contacts 413. Relay 420 is energized over its previously described energizing circuit on release of relay 360 and before release of relay 370, but as before explained does not operate relay 360. Relay 410 also opens one of the holding circuits to relay 320 at contacts 414 and at contacts 411 opens the circuit to relay 450, which disconnects the secondary of coil 402 from the + and — leads to the selector. Relay 370 on releasing opens another holding circuit to relay 320 at contacts 377, and relay 320 now releases to close contacts 324 to prepare a circuit for placing 6000 cycle alternating current unlocking pulse on leads +L and —L and at contacts 323 opens the circuit to relay 310, which being slow-to-release does not yet restore. Contacts 378 on opening remove ground from lead C', however contacts 379 close to maintain lead C' grounded to busy the repeater from contacts 316.

Relay 370 on releasing also closed contacts 372, before relay 320 is released, to complete a circuit over contacts 355 and 322 to operate relay 230. At contacts 232 a ground is applied for maintaining relay 310 operated and thereby maintain the repeater busy from ground through contacts 315 and 379, when relay 370 is restored. Relay 230 completes an obvious circuit for relay 220 at contacts 231 and also opens contacts 233 to prevent relay 270 operating until the coin disposal operation is completed. Relay 220 operates and at 225 maintains lamp 470 lighted over lead B and closes contacts 226. Relay 250 now has a circuit from battery through its coil, closed contacts 371, 241, 261, make contacts 222 and 224, both the —L and +L lines to the paystation, through restoring magnet 40, contacts 7, coin magnet 50 and relay 60 to ground if a coin is on deposit. Relay 250 operates to close contacts 251 to provide another operating circuit for relay 230, at contacts 252 it prepares a circuit from the pulse sender P6 which is common to all repeaters such as 200 and is continuously operating.

When contacts P1 associated with the lower cam of the pulse P6 are closed, ground is forwarded over contacts 252 and 245 to operate relay 240. Relay 240 operates to close contacts 243 to provide another holding circuit for relay 230 and closes contacts 244 to complete its own holding circuit from ground on contacts P2 which are held closed by the upper cam of pulser P6 for a predetermined time. It also opens its own previously described operating circuit at contacts 245, and at contacts 241 opens the previously described operating circuit for relay 250, which releases.

Relay 240 on operating closes contacts 242 so that —110 volt refund potential is applied over contacts 431, conductor 291, contacts 242, 261, 222 and 224 respectively, 211 and 213 respectively to both the —L and +L conductors. As the hookswitch springs 1 are open the —110 volt potential extends only over the side of the paystation circuit connected to the +L line, restoring magnet 40, coin springs 7, coin magnet 50 and relay 60 to ground. Relay 60 being of high resistance operates first to close contacts 61 to now apply the —110 volt potential from both sides of the line to insure the full operation of coin magnet 50 and restoring magnet 40. The restoring magnet 40 operates to reset springs 5 if only one nickel were deposited and the coin magnet 50 operates to refund the deposited coin or coins and reset springs 6 and 7 all in a well known manner. It will be noted that as the —L and +L conductors of line 100 are disconnected from the other paystation circuits that coin magnet 50 receives its full operating voltage.

As previously described if the call had been completed relay 430 is operated. On termination of the conversation, the calling party replaces his handset, and the loop to relay 360 is opened as before described, to initiate the aforedescribed sequence of operations. Relay 430 is held operated from a ground at contacts 314, and through contacts 226 as relay 220 operates to complete a holding circuit for the lower winding of relay 430 over conductor 437 and contacts 436. Now when contacts 222, 224 and 242 are closed, +110 volt collect potential is applied over the aforedescribed coin magnet circuit, as contacts 431 are open and contacts 432 closed, to operate relay 60, coin magnet 50 for a collect operation and restoring magnet 40.

When the pulser completes one cycle of operation, which occurs during a predetermined time period, ground is removed from contacts P2, and relay 240 releases to open the circuit to relay 230 at contacts 243, and it in turn releases. Relay 240 is prevented from reoperating when the pulser goes through another cycle as the circuit to relay 250 is now opened at coin springs 7. As magnets 40 and 50 operate together, a failure on their part to operate and open springs 7 initiates another cycle of operations for applying coin potential to the coin magnet for disposing of an undisposed coin. Relay 230 releases, restores 220 at contacts 231, at contacts 232 it removes a holding ground for relay 310, and at 233 completes the circuit for operation of relay 270. Relay 220 on restoring opens the holding circuit for the lower winding of relay 430 so that it restores. Relay 270 operates before relay 310 releases, from ground on the break contacts 324 of released relay 320, the make contacts 312 of relay 310 and contacts 233 to winding of relay 270. Relay 270 operating, completes a circuit at contacts 273 for relay 330, and at contacts 272 connects lead F2 to the primary of transformer 304. Relay 330 operating, grounds the tone generator start lead at springs 338 and at contacts 332 and 335 connects the secondary of transformer 304 in series with capacitor 303 to both line conductors via the path previously described.

At the locked-out paystations the shunting of the capacitors of the previously described resonant circuit by a capacitor corresponding to 16 changes the frequency of resonance to that of the lock-out pulse namely 6000 cycles per second. This retuned resonant circuit will again fire the gas tubes corresponding to 15, which action will again reoperate the relays corresponding to 130, but the lock-out relays corresponding to 120 being operated, the circuit to the relays corresponding to 110 is completed at contacts corresponding to 126. The relay corresponding to 110 operating opens the circuit to the lock-out relay at contacts corresponding to 111. The lock-out relay releasing removes the capacitor corresponding to 16 from its shunting position, thus again placing the tuned circuit in readiness for receipt of a lock-out pulse.

*A reverting call*

This type of call is initiated in the same manner as described for a local call to a subscriber on another line, namely; by lifting the handset and by deposit of the appropriate coin value to operate the same relays over the same circuits as previously described for seizing the selector 490. The calling party, to reach another party on the same line, dials the digit zero, and thereby operates the selector to the tenth level. The selector causes ground to be returned over lead C in any well-known manner from contacts closed by the selector normal post springs to operate relay 440, which closes contacts 441 to provide ring back tone over condenser 408, contacts 462, 441, 353, 334, 223 and 213 to the +L lead back to the calling party's receiver so that he is informed that a signalling operation is taking place and that he should not continue to dial. Contacts 442 close to complete another circuit over lead B for holding busy lamp 470 and corresponding lamps at each operator's position lighted. A holding circuit is also completed for relay 440 over contacts 373, 411 and 444. At contacts 445 a circuit is completed over contacts 466 and lead CS for lighting the calling station lamp 471, and lamps corresponding thereto at each operator's position so that they are signalled and one of them answers the call. At contacts 443 the circuit to relay 450 is opened, and it releases to open the energizing loop to the selector line relay at contacts 452 and 454 so that the selector releases in the well-known manner. At contacts 446 an alternate holding circuit for relay 370 is provided. Relay 450 on releasing prepares a circuit at contacts 455 for relay 460 to be completed when an operator answers the call.

The operator inserts her plug at jack J1 to close contacts 472 and ground lead H to complete a previously prepared circuit over contacts 357 and 455 to relay 460, which operates to complete at contacts 461 and 463, a loop from her cord circuit including conductors T and R respectively, contacts 451 and 453 respectively to the secondary of coil 402 through contacts 361 and rectifier 404. She may now converse over repeating coil 402 and including the previously described paystation loop with the calling party. At contacts 462 the circuit for supplying ring back tone to the calling party is opened and at contacts 464 another holding ground is supplied to relay 440. Relay 460 completes its own holding circuit from ground through contacts 374, 412 and 465. At contacts 466 is opens the circuit to all the calling signal lamps to extinguish them, and at contacts 467 it completes a circuit to the lower winding of relay 430, which operates and closes contacts 432 to prepare for the application of collect potential to the line. At contacts 468 a circuit is prepared for providing manual coin control which will be described. The operator if she desires may now change cords without releasing the connection as relays 440 and 460 are held by relays 370 and 410.

The operator on securing the number of the desired called party instructs the calling party to replace his handset, after which, he will be rung periodically, and when the ringing has stopping he should remove his handset. When the calling party replaces his handset, springs 1 open to release relay 360 which in turn closes contacts 363 and completes a circuit to a cord lamp (not shown) over contacts 376 and 434 and lead S so that the lamp lights to indicate to the operator that the calling party has hung up. Relay 410 is deenergized shortly after contacts 362 open, but relay 420 is not energized when contacts 363 close as contacts 435 are open. Relay 370 does not release, when contacts 413 open, as it is held from contacts 446. Relay 320 is maintained energized, when contacts 414 open, by ground on contacts 377 to in turn maintain relay 310 energized. It will therefore be noticed that the repeater 200 cannot be seized by another party.

As there are only four parties on the line and the last number of the called party indicates his individual ringing frequency the operator now inserts her ringing cord 510 in jack J3 in Fig. 5 for the purpose of supplying that ringing frequency to signal the called party.

The operator operates key K8 to apply ground potential over lead S2, contacts 313 and 233 to operate relay 270. Relay 270 prepares a circuit for sending a 6000 cycle alternating current unlocking pulse to both line conductors over a path previously described. The functioning of the components at each of the paystations on the line will be identical to that of the stations whose action was previously described upon completion of an outgoing local call.

The operator after the reconnection of the stations to the line will now alternately and periodically operate the key such as K4, K5, K6 or K7 individual to the ringing frequency of the called party and the key individual to the frequency of the calling party to apply the desired ringing frequencies to the conductor R2. Simultaneously ground is applied from the first operated ringing key of cord 510 over conductors T2 to relay 210 which operates to connect conductor R2 to the —L line at contacts 212 and apply a return ground to +L line at contacts 214 each time a ringing key is operated. The ringing frequencies of the called and calling parties are than alternately sent over the —L line from conductor R2, a capacitor corresponding to 14, a spring corresponding to 3 and a ringer corresponding to 90 at each party line station and back over the +L conductor to ground at contacts 214 to operate the ringers individual to the applied frequencies at the called and calling stations in any well-known manner to signal the called party and the calling party.

If the called party does not answer within a prescribed time period, the operator simply discontinues ringing both parties so that the calling party comes back on the line. Lock-out potential is not applied to the other stations when any party now connects to repeater 200 as relay 320 is operated to prevent operation of relay 330 and therefore maintain the lock-out circuit open. Relay 360 operates over a circuit already described to operate relay 410. Contacts 363 open to extinguish the cord lamp to inform the operator that someone has answered. The operator informs the party, if the calling party is on the line, that the called party has not answered. The party then proceeds to replace his handset to release relay 360 and 410 and relight the cord lamp over a previously described circuit.

If for any reason the operator wishes she may test for a deposit at this time. This is important, if the party that came on the line is not the calling or called party, and requests her to complete a call to another line. Cord 520 is inserted into jack J2 and key K3 is then closed to forward ground over lead T1, contacts 468, lead 269 to relay 260. It operates to close contacts 262 and 263. At contacts 263 an obvious circuit is completed to relay 230 to in turn operate relay 220. The +L conductor connected over a previously described circuit to ground through coin magnet 50 is now connected through contacts 213 and 224 to contacts 262 and lead R1. No circuit is completed to relay 250 as contacts 261 are open. The —L conductor is likewise connected through contacts 211, 222 and 262 to lead R1. If coin springs 7 are closed indicating a deposit, ground is forwarded over lead R1 from the —L lead, chain contacts of K1 and K2 to battery through the winding of relay 530. Relay 530 operates to close contacts 531 to light coin deposited indicating lamp 540. Thus the operator for various purposes may perform a test to determine if a coin is deposited and take appropriate action. This test may be performed at the end of an ordinary local call to determine if the coin magnet and restoring magnet have operated.

When the operator desires to refund, she releases K3 to open the circuit to relay 530 which extinguishes lamp 540 and operates K1. Ground is again provided over lead T1 to operate relay 260 and —110 volt refund potential is forwarded over lead R1, contacts 262 and a portion of the coin magnet operating circuit previously described to operate relays 60 and 40 and coin magnet 50 as previously described. If the operator desires she may operate key K1 before releasing K3, as operation of K1 opens the circuit to relay 530. The operator now removes her plug from J1 to remove ground from lead H at contacts 472 and releases relay 460, which in turn releases relay 440 at contacts 464. The plug must be removed after the party on the line hangs up and after refund potential is applied in a manner just described, to prevent a collect operation of the repeater. Contacts 467 open one circuit to the lower winding of 430 but it holds from contacts 274. Release of 440 opens the circuit to relay 370. Release of relay 370 now operates relay 230 as previously described. Relay 220 operates for no purpose as no circuit can be completed to relay 250 as springs 7 are open. Relay 240 is therefore not operated. Relays 320 and 310 release in turn as before described. The holding circuit for the lower winding of relay 430 is opened at contacts 314, but relay 430 does not release until relay 220 opens contacts 226. Relay 230 releases as contacts 322 are open to in turn release relay 220. The unlocking pulse is now connected to the line as relay 270 operates, all as previously described.

In the event the called party answers the call relay 360 is energized over a circuit similar to the previously described circuit for station P1. Relay 410 is energized. The operator's cord lamp is extinguished when contacts 363 open and she stops her ringing operation. The calling party on being signalled by not hearing the periodic ring removes handset. When the calling party removes his handset, his transmitter and receiver are connected to the +L and —L lines to thereby complete a talking circuit to the party at the other paystation on the line. Talking battery is forwarded from the left side of relay 360. The lock-out pulse cannot be sent as on an originating call as relay 320 is operated. She then disconnects her plugs from jacks J1 and J3 respectively. The operator may plug back in at any time to monitor the conversation without operating any relays.

When both parties disconnect, relay 360 releases to release relay 410. Relay 410 at contacts 412 opens the circuit as previously described to relay 460. Relay 460 releases to open the circuit to relay 440 which in turn releases to open the circuit to relay 370. Relay 370 releases to open the contacts 378 for supplying busy ground at the connector bank. This ground is now supplied from contacts 315 as previously described. Contacts 372 close to complete a previously described circuit for relay 230. It operates to energize relay 220 which in turn completes a previously described circuit for relay 250 through the calling party's coin springs 7. Relays 320 and 310 are respectively released as already described. Relay 220 holds the lower winding of relay 430 energized from contacts 226 over conductor 437 after contacts 314 open. Relay 250 makes the test for a deposited coin and if one is on deposit it is collected as previously described upon completion of an outgoing local call, after which relays 230 and 220 release as previously described.

A calling or called party by remaining on the line after the other party hangs up, maintains relay 360 operated and prevents the repeater performing a collect operation until he hangs up. Relay 440, which maintains relay 370 operated, cannot be released unless both the subscriber and the operator have disconnected as relay 440 is under their mutual control through contacts of relay 460. Relay 370 maintains the trunk seized and therefore relay 440 must be released to idle the trunk. Thus once an operator has answered, the trunk is under control of both the operator and subscriber, and the subscriber is not able to complete any call over the selector as the selector cannot be seized as long as relay 440 is operated. The operator may of course change plugs without upsetting the connection as long as relay 360 is held operated by a party on the line. Either party, if alone on the line, may signal the operator by jiggling his hookswitch to rapidly release and reoperate relay 360 to flash the operator's cord lamp and signal her. She may then plug in and perform legitimate services requested by the party on the line. She may of course test for a coin deposit and perform a coin collect or refund operation in the manner explained. It will be observed that a party operating his hookswitch to flash the operator is in no danger of being locked out.

*Toll calls*

A party at one of the paystations such as P1 initiates a toll call by seizing the repeater 200 and selector 490 as previously described and dialing the digit zero on the selector to step the selector to its tenth position where its normal post springs close to send ground back on lead EC for operating relay 440 as previously described. The circuit to relay 450 is opened and it restores to release the selector. Relay 440 operates to signal the operator by lighting lamp 471. The operator inserts her plug in jack J1 to operate the aforementioned relays 460 and 430 and converses with the calling party. In case of any question as to the amount the calling party has deposited to call her, the operator manually refunds any coins in the coin hopper before completing the connection in a manner already described for refunding coins on an uncompleted reverting call. That is, she inserts coin cord 520 into jack J2 and operates key K3 to test for the deposit of a coin, after which she operates key K1 to refund the deposit all in a manner previously described. In this type of call, however, ringing cord 510 is not inserted in jack J3 for the purpose of unlocking the other stations on the party line as was done on a reverting call. She secures the information desired and then extends a toll connection in any well-known manner over her cord circuit to the desired called party and on securing the called party instructs the calling party to deposit the appropriate coin value before completing a talking circuit from repeating coil 402 through her cord circuit in any well-known manner. The operator identifies the amount deposited by the tones generated in coin transmitter 12 and sent over the trunk conductors −L and +L, the repeating coil 402 and the operator's receiver.

The operator, by observing when her cord lamp lights, knows when the calling party has disconnected to release the connection. She may also time the call thereby, and from time to time interject for the purpose of requesting the deposit of more coins. Noticing her lighted cord lamp, she merely removes her plug from jack J1 to release relay 460 to in turn release relay 440. If she removes her plug prior to the calling party disconnecting, relay 460 held operated over contacts 465, 412 and 374, releases on restoration of relay 410 to momentarily light lamp 471 over contacts 445 and 446 to signal release of the repeater. Relay 440 releases immediately after contacts 464 open, and opens the lamp 471 circuit at contacts 445. Relay 440 also releases relay 370. Relay 430 is held operated by relay 310. Relay 310 starts to release, but relay 230 operates to hold relay 310 and to operate relay 220, which also holds relay 430. The further operation of coin deposited test relay 250 and coin disposal relay 240 is as has been explained previously.

If this is a delayed toll call, wherein the operator cannot immediately secure the called party, she instructs the calling party to hang up and informs him that she will ring him when she secures the desired called party. As described before on a reverting call, release of the connection by the calling party only releases relays 360 and 410 as long as the operator maintains her plug in jack J1. The repeater 200 is therefore held as long as the operator desires. She may release the entire connection on securing the desired information and thereby allow other calls to be established through repeater 200 as described. By later inserting her plug in jack J1, when the repeater is idle, she reoperates relay 460 and at contacts 464 operates relay 440. Relay 440 reoperates relay 370 which busies the repeater to incoming calls. Relay 430 is operated from relay 460 to prepare for a collect operation. None of the party line stations are locked out. If the operator had not removed her plug from jack J1 while securing the called party, the calling party's station would remain unlocked, while the other stations would remain locked out. She then inserts the plug of her ringing cord in jack J3 and operates one of the keys K4, K5, K6 and K7 individual to the calling party's ringing frequency to signal him. When he answers as indicated by relay 360 darkening her answer lamp, she requests the deposit of the required coin value. She then completes the connection through her cord circuit. At the end of the call, coins are collected in a manner already described and the repeater 200 released. The operator, it will be noted, may on her own volition establish a connection to any one of the stations on line 100, by employing the procedure outlined above.

*Incoming calls*

A local subscriber such as S8 or an incoming toll operator extends a connection over the well-known Strowger type switching apparatus such as 390 to a connector such as 395. The connector 395 is operated by two dialled digits to find the repeater 200 and connect to leads EC′, the trunk conductors L′ and −L′, and C′. The connector switch tests for absence of ground over lead C′, contacts 379, 316 and through the lower winding of the relay 350. If no ground is encountered to indicate the line is busy, battery through the lower winding of relay 350, operates the switch-through (not shown) of the connector switch and lead C′ is grounded to operate relay 350 over the above circuit. Relay 350 at contacts 357 opens a point from lead H to relay 460 and prevents the operator from interfering by plugging in to operate relay 460. At contacts 355 it opens a point in the circuit to relay 230, and at contacts 356 busies the trunk at the operator's position by lighting lamp 470 over lead B. Contacts 352 and 354 close to connect the +L′ and −L′ conductors, respectively, to conductors +L and −L, respectively, through contacts 213, 223 and 334 and 211, 221, and 331, respectively. In the meantime the third digit, dialled on the connector switch, results in the switch selecting the harmonic frequency individual to the called substation associated with the repeater 200, and as the connector switch-through relay is operated the ringing frequency is sent out over the −L′ conductor, contacts 352 and the already described portion of the ringing circuit and is returned over contacts 354 and the +L′ conductor to operate the ringer corresponding to 90 at the desired station and signal the called party. Simultaneously ringback tone is returned to the calling party from the connector in the well-known manner. As previously mentioned, the present invention is not limited to an arrangement utilizing a three digit connector such as described above, and it is here described only for the purpose of illustrating the manner of operation of the invention. When the called party removes his handset from the hookswitch, the substation ringer is cut-off at contacts 3, and a D.C. circuit for operating the connector ring cut-off relay (not shown) is completed through the already described paystation loop, excluding, respectively, contacts 361, coil 402, relay 360 and contacts 353 and including contacts 352, the −L′ lead to battery on one side of the cut-off relay and from ground on one side of said relay over the +L′ lead and contacts 354. The ring cut-off relay operates and extends the loop to operate the relay (not shown) for reversing battery on the trunk to the connector and also completes a talking circuit to the calling party. The parties may now converse. Ground is in the meantime extended, over lead EC′ by the switch-through relay, to battery through the lower winding of relay 340. It operates and completes a circuit for relay 330 over contacts 358, 342 and 326 so that relays 330, 320 and 310 operate as previously described to apply lock-out battery momentarily to the non-called stations. The holding circuit for relay 320 is completed now over contacts 358, 342 and 325 as relays 370 and 410 are not operated. At contacts 341 ground is forwarded from lead EC′ to energize the upper winding of relay 350. Relay 310 opens the circuit to the lower winding of relay 350 at contacts 316, however, it is held operated by the described circuit to its upper winding. Relay 310 also busies the repeater to incoming calls by ground forwarded over contacts 315 and 379 to C′.

The release of the connection is under control of the calling party so that when the circuit to the line relay of the connector is opened by the calling party it releases. The called party line subscriber on replacing his handset only opens the circuit over the trunk conductors to the connector battery reversing relay. He cannot signal the operator. When the calling party releases the connector, ground is removed from lead EC′ to deenergize the upper winding of relay 350 and the winding of relay 340. Relay 350 restores to open the circuit to relay 320 at contacts 358. It also reconnects the paystation circuit to coil 402 and relay 360 at contacts 351 and 353. Relay 360 cannot operate, for as relay 350 restores it completes a circuit to relay 230 which operates relay 220 which in turn opens the circuit at contacts 221. Relay 250 makes a test for a deposited coin, but since there is no coin it does not operate, and as relay 320 releases relay 230 falls back permitting relay 270 to operate to send an unlocking pulse as previously described. Relay 310 does not release until the test for a deposited coin has been completed, thus keeping the repeater marked busy at both the operator's position lamp 470 and the connector bank lead C′.

In the case of a reverse charge call, the connection must be made through an operator having access to the repeater 200 from a jack such as J1. This is because she must control the connection through her cord circuit. The operator noticing the busy lamp 470 is extinguished, plugs in at J1 to operate relay 460. Relay 440 operates to in turn operate relay 370. Relay 430 also operates to prepare for a collect operation. The operator now plugs in her ringing cord 510 and as all stations are unlocked merely operates the proper key to signal the called party. The called party on answering operates relays 360, 410, 330, 320 and 310 as previously described. Relay 330 of course releases immediately. The call is then completed when the called party deposits the proper coin value in the same manner as on outgoing delayed toll calls. The call is later released and coins collected as previously described.

I have described my invention in its particulars but because of its many applications, versatility, and breadth, what I think is the scope of my invention is incorporated in the following claims.

What is claimed is:

1. In a telephone system, a two wire party line connected to a central office and having a plurality of stations connected thereto, first means at each station for connecting and disconnecting the associated station to and from the party line, means at the office operated responsive to the initiation of a call from one of said stations for connecting an alternating current of one frequency to said line, control means in each station operative in response to the connection of said alternating current to the line to operate said first means to disconnect all stations except the calling station from the line, means at the office for thereafter connecting an alternating current of another frequency to the line, means operated responsive to the operation of said first means for disenabling said control means to respond to said one frequency of alterating current and for enabling said control means to thereafter respond to said other frequency said control means thereafter operative in response to the connection of said current of the other frequency to the line to control said first means to reconnect the disconnected stations to the line.

2. In a telephone system, a plurality of paystations having a common two wire party line connection to a central office, means for providing secret service to a party at one of said paystations upon the initiation of a call therefrom, said means comprising at each paystation a relay and a positioning control circuit therefor, means at said central office responsive to the initiation of a call from said line for impressing a first current of one frequency to the line, means including said positioning circuits controlled in response to the receipt of said first current to position the associated relays at all of the associated paystations except the one initiating the call to disconnect said associated non-calling paystations from said line, means operated by said relay in said one direction for disenabling said control circuit to respond to said first current of one frequency and for enabling said control circuit to thereafter respond to a second frequency of current, means at said central office effective upon termination of a call to impress a second current of another frequency on the line, means including said positioning circuits at said stations controlled in response to said second current to control the associated relays at said non-calling paystations to reconnect all of said disconnected paystations to said line.

3. In a telephone system, a plurality of paystations connected to a two wire line terminating in a central office, means at said central office for impressing a first alternating current frequency on said line upon initiation of a call from or to said line, and for impressing a second alternating current of another frequency on said line upon termination of a call including said line, means at each of said paystations comprising a series resonant circuit tuned to said first frequency, a first, second and third relay, means for returning said resonant circuit to said second frequency and a three electrode cold cathode gas tube, said gas tube effective to operate said first relay upon detecting a voltage across a portion of said resonant circuit due to said first frequency, said first relay effective to operate said second relay which locks out said paystation and operates said means to retune said resonant circuit to said second frequency, said gas tube, said first relay and said retuned resonant circuit effective to operate said third relay to unlock said paystation upon sensing said second frequency.

4. In a telephone system, paystations connected to a two-wire line terminating in a central office and having means for receiving a deposited coin and disposing of said coin, means for providing secret service to prevent a plurality of said paystations using said line simultaneously, said means including at said central office a means for impressing one of two alternating current frequencies on said line, said first frequency locking out said paystations not originating or receiving a call, and a second frequency for reconnecting said locked out paystations to said line, said second means including at each paystation a tuned resonant circuit responsive to said first alternating current frequency when said paystation is connected to said line, and to said second frequency when said paystation is locked out, said second means also including a gas discharge tube and a relay responsive to the voltage across a portion of said resonant circuit due to said first impressed alternating current frequency to energize a lock-out relay at each paystation not originating or receiving a call to thereby insure secrecy to the user of said paystation, and responsive to said voltage across said portion of said tuned circuit due to said second frequency to reconnect said disconnected station upon termination of said call.

5. In a telephone system, a plurality of paystations connected to a two wire line terminating in a central office, means at said central office for impressing an alternating current of a first frequency to said line upon initiation of a call from or to said line, and for impressing an alternating current of a second frequency to said line upon termination of a call, means at each of said paystations comprising a series resonant circuit tuned to said first frequency, a first, a second and a third relay, means for retuning said resonant circuit to said second frequency and a transistor, a transistor effective to operate said first relay upon detecting a current through said resonant circuit, said first relay effective to operate said second relay at each of said paystations other than the calling or called paystations to thereby disconnect said paystations from said line and retune said resonant circuit to said second frequency thereby insuring secrecy to the user of said called or calling paystatiton, said transistor, said retuned resonant circuit and said first relay effective to operate said third relay to unlock said paystations upon the application of said second frequency to said line.

6. In a telephone system, a party line having a plurality of substations connected thereto, relay means at each substation normally connecting the associated substations to the party line, means responsive to the initiation of a call by one of said substations for applying alternating current of one frequency to said line, means comprising a transistor and resonant circuits at each of said substations for detecting the presence of said alternating current on said line and for amplifying it, said amplified current effective to cause the operation of said relay means at all non-calling substations for disconnecting the non-calling substations from the line means for applying alternating current of a different frequency to said line in response to the termination of said call, means responsive to the operation of said relay means for altering said resonant circuits at all non-calling substations to enable detection of the receipt of said different frequency by said altered resonant circuits and said transistors, means in the non-calling substations responsive to the detection of said different frequency by said altered resonant circuits and said transistors for restoring said relay means to reconnect said non-calling substation to said line.

7. In a telephone system, a central office, a plurality of substations, a two wire line interconnecting said central office and said substations, auxiliary apparatus at each of said substations, each said apparatus having a predetermined cycle of operation in order to disconnect and to reconnect its associated substation and said line, a first and a second tone generating means at said central office, means responsive to the initiation of a call from one of said substations for momentarily connecting a frequency from said first tone generating means to said line and responsive to the termination of said call for again momentarily connecting another frequency from said second tone generating means to said line, a tuned circuit means included in the auxiliary apparatus at each of the non-calling substations on said line operated responsive to the first momentary connection of said first tone generating means to said line for controlling the auxiliary apparatus thereat to operate it through a portion of said predetermined cycle in order to disconnect the associated non-calling substations from said line, means in said auxiliary apparatus operative upon the operation of said auxiliary apparatus through said portion of said predetermined cycle for retuning said tuned circuit, and said retuned circuit responsive to the connection of said second tone generating means to said line for controlling the auxiliary apparatus thereat to operate it through the remaining portion of said predetermined cycle in order to reconnect the associated non-calling stations to said line.

8. In a telephone system, a central office, a plurality of substations, a two wire line interconnecting said central office and said substations, auxiliary apparatus at each of said substations, each said apparatus having a predetermined cycle of operation in order to disconnect and reconnect its associated substation and said line, a first and a second tone generating means at said central office, means operated during the placement of a call to one of said substations for momentarily connecting said first tone generating means to said line and responsive to the termination of said call for momentarily connecting said second tone generating means to said line, tone controlled means included in the auxiliary apparatus at each of the non-called substations on said line operated responsive to the momentary connection of said first frequency of current from said first tone generating means to said line for controlling the auxiliary apparatus thereat to operate it through a portion of said predetermined cycle in order to disconnect the associated non-called substations from said line means in said auxiliary apparatus operative upon the operation of said auxiliary apparatus through said portion of said predetermined cycle for changing said tone controlled means, and said changed controlled means responsive to the connection of said second frequency of current from said second tone generating means to said line for controlling the auxiliary apparatus thereat to operate it through the remaining portion of said predetermined cycle in order to reconnect the associated non-called stations to said line.

9. In a telephone system, a party line, a plurality of substations connected to said line, a first and a second tone generating means capable of generating a first and a second tone, means for momentarily connecting said first tone to said line upon the initiation of a call from or the placement of a call to a substation on said line, means for momentarily connecting said second tone to said line upon the termination of a call to or from a substation on said line, means at each substation responsive to said first tone for locking itself out from the line and for reconnecting itself to said line in response to the placement of said second tone on said line, means at each substation effective when calling or called to disable its lockout means, said lockout means comprising a tone filter, a transistor amplifier, a first electro-mechanical device operated by current amplified by said transistor amplifier, a second electro-mechanical device, said tone filter permitting the passage of said first tone to said amplifier when said second electro-mechanical device is unoperated and permitting the passage of said second tone to said amplifier when said second electro-mechanical device is operated, said second electro-mechanical device, when operated, locking out its associated substation from the line and when released reconnecting the associated substation to the line, said first electro-mechanical devices at each of the non-calling or non-called substations operated responsive to the momentary connection of said first tone to said line to operate said second electro-mechanical devices to lock-out said non-calling or uncalled substations to insure secrecy to said calling or called substation, said first electro-mechanical device at each locked out substation responsive upon termination of a call from a calling or to a called substation on said line to the momentary connection of said second tone to said line to cause said second electro-mechanical device to release to cause said locked out substations to reconnect said line in order to reconnect said locked out substations to said line.

10. In a telephone system as set forth in claim 7, including means at said calling substation comprising a break spring combination in the hookswitch operated when said calling substation initiates the call to prevent the operation of said auxiliary apparatus at the calling substation and the disconnecting of its substation from the line.

11. In a telephone system as set forth in claim 8, including means at said called substation comprising a break spring combination in the hookswitch operated when said called substation is called to prevent the operation of said auxiliary apparatus at the called substation and the disconnecting of its substation from the line.

References Cited in the file of this patent

UNITED STATES PATENTS

| | | |
|---|---|---|
| 2,180,963 | Pearce | Nov. 21, 1939 |
| 2,202,474 | Vroom | May 28, 1940 |
| 2,209,022 | Jauch | July 23, 1940 |
| 2,306,121 | Hagen | Dec. 22, 1942 |
| 2,340,798 | Deal | Feb. 1, 1944 |
| 2,782,259 | Dimond | Feb. 19, 1957 |